United States Patent [19]

Lasater

[11] Patent Number: 4,696,718
[45] Date of Patent: Sep. 29, 1987

[54] WATER PURIFICATION DEVICE

[76] Inventor: Henry C. Lasater, P.O. Box 616, Cuba, N. Mex. 87013

[21] Appl. No.: 826,083

[22] Filed: Feb. 4, 1986

[51] Int. Cl.$^4$ ............................................. B01D 3/02
[52] U.S. Cl. ...................................... 202/176; 55/195; 55/208; 203/11; 203/DIG. 8; 210/180; 210/188
[58] Field of Search ................. 203/DIG. 8, 25, 4, 10, 203/11, 39, 86, 91, 27, 99, DIG. 16; 55/36, 55, 57, 189, 195, 159, 208; 202/163, 167, 176, 205, 232, 233–235; 210/695, 748, 664, 222, 223, 188, 774, 806, 808, 182, 183, 180

[56] References Cited
U.S. PATENT DOCUMENTS
3,890,207 6/1975 Chapman et al. ............ 203/DIG. 8

Primary Examiner—Frank Sever
Attorney, Agent, or Firm—Moore & Hansen

[57] ABSTRACT

A highly efficient water purification device includes a degasification apparatus, a distillation apparatus and an ion removal device to purify contaminated water. When a partial vacuum is applied to the degasification apparatus, dissolved gases leave the water, and a heat exchange process occurs which heats the gases and cools the degassed water. A gas exhaust channel transfers the warmed gases to a heating coil in the distillation apparatus to preheat water for evaporation therein while the cooled, degassed water is transferred to a condenser to condense vapor and steam. The degasification apparatus may include one or more towers in which a vacuum is formed by first filling the towers with water, sealing the tower top, and then draining water from the tower bottom; this vacuum may be applied to the distillation apparatus and a reservoir by transferring the vacuum from the towers through a depressurization conduit to thereby achieve boiling in the distillation apparatus at reduced temperatures.

20 Claims, 4 Drawing Figures

WATER PURIFICATION DEVICE

BACKGROUND OF THE INVENTION

The invention relates to the field of water purification by degassing and distilling to remove dissolved gases and solids from the water.

Many areas of the world have serious water contamination and pollution problems of either a natural or man-created origin. Parts of the American West and other areas throughout the globe have water carrying high levels of sulphur dioxide, hydrogen sulfide and various other gases and minerals which make the water, at best, unpalatable and at times render it wholly unsuitable for drinking except after expensive purification measures. Other coastal areas have extensive supplies of readily available sea water but little fresh water. Still other regions have water supplies which have become so polluted by chemical wastes that extensive purification is needed before such water is again fit for human consumption. The present invention is directed toward the purification of such water and provides a workable, economical, solution for many of these contamination and pollution problems.

Typically, the purification of water can involve three distinct stages. One stage includes the use of distillation for the removal of dissolved solids contained in the water. Another stage of purification removes gases dissolved in the water which could pass through the distillation process. Accordingly, the degasification stage is best conducted prior to distillation. While these two stages are adequate in many purification processes, where high water purity is required it can also be desirable to remove charged ions, which if not removed by other means, can pass through the distillation process. Such ion removal can be highly desirable in order to produce the high levels of water purity needed in various medical applications and for research.

Since many purification projects require large volume water outputs, it is important that the purification process be accomplished with high energy efficiency and that minimal energy be required to support the purification operation.

Water purification through distillation is well recognized, and it is also known to utilize a lowered atmospheric pressure over a body of water so as to degasify the water; such a degasficiation system is shown in U.S. Pat. No. 4,407,665. It is also known to operate a degasification device in conjunction with a distillation system to use lowered atmospheric pressure in a distillation apparatus so as to lower the boiling point of the water to more quickly and inexpensively evaporate the water at lowered temperatures with less energy consumption. The present invention takes the degasification and distillation purification processes further in providing an apparatus which utilizes energy which is otherwise lost in the degasification process to assist the subsequent distillation step.

SUMMARY OF THE INVENTION

A water purification device includes a cooperating degasification apparatus and a distillation apparatus, each of which employs a partial vacuum during operation. The degasification apparatus utilizes the partial vacuum to remove dissolved gases from water, and the distillation device uses it to lower the water's boiling point to create rapid evaporation at lowered temperatures.

While it has been known to lower the atmospheric pressure in a distillation device by a vacuum pump or by placement of the device at high altitudes, the present invention avoids the expense of continual vacuum pump operation by utilizing a falling water level in a vertical degasification tower to create the partial vacuum above the water. The device also transfers the reduced pressure effect to the distillation apparatus so as to largely eliminate the need for a vacuum pump during steady state operation of the distillation device.

The invention utilizes heat transfer phenomena associated with the degasification tower to increase efficiency of the subsequent distillation step and to diminish energy requirements. It has been found that during the degasification step the removed gases are heated in the process of removal while simultaneously the water from which the gases are removed is cooled. The present invention utilizes this heat transfer phenomena to promote the subsequent distillation step by circulating the heated gases through a heat exchanger in the distillation apparatus to thus transfer the heat from the gases to the water which is to be evaporated. Simultaneously, the cooled liquid resulting from the degasification step is circulated to the distillation apparatus and is used to condense the water vapor resulting from such evaporation.

An ion removal apparatus is also shown in conjunction with the distillation apparatus and utilizes electrical and magnetic fields positioned along the path of the water vapor in the boiler so as to separate ions from the vapor, drawing them to an anode and cathode. The magnetic field also passes through the liquid in the boiler, and metal ions moving about in the boiler during boiling tend to interact with the magnetic field and are heated by induction, thereby further injecting heat into the boiler and aiding the distillation process.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENTS

Figure 1:
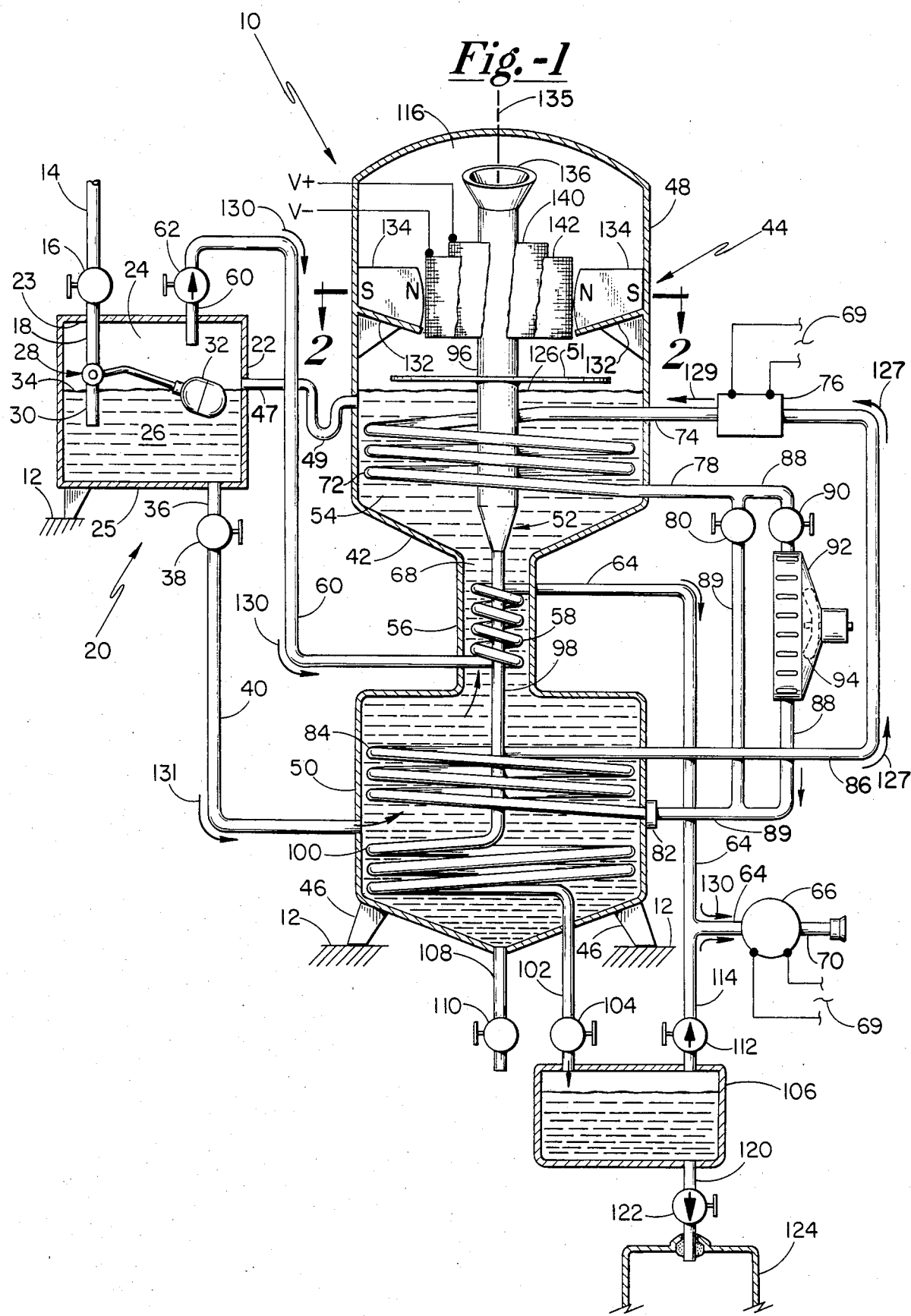
FIG. 1 is a schematic view of a first embodiment of a water purification device taken partly in cross section.

Referring now to FIG. 1, a first embodiment 10 of a water purification device embodying the invention is supported on a stationary surface 12 and is connected in any known manner with a source of impure water here designated as impure water inlet pipe 14. The water requiring purification will typically contain dissolved gases such as air, hydrogen sulfide, sulphur dioxide and others, as well as dissolved solids and living organisms such as bacteria, microbes, algae and the like.

A degasification apparatus 20 includes a degasification container 22 which is a sealed, airtight tank having an interior chamber 24 which may be selectively evacuated so as to create a near vacuum therein which is usable for degasifying the water within the chamber. The container 22 is formed with rigid walls and is tightly sealed so as to resist water leakage from the container and unwanted seepage of external air into the chamber 24. The chamber 24 is shown containing a volume of impure water 26 whose level is controlled by a conventional float valve 28 having a ball float 32. The float valve is connected through pipe 18 and valve 16 to impure water inlet 14 and passes impure water into chamber 24 through spigot 30 wherever the ball float 32 drops below a predetermined lever 34, it being understood that when the ball float rises again to level 34, incoming water flow through the valve 28 ceases.

A water outlet pipe 36 extends from the bottom 25 of the container 22 and connects to manually controllable valve 38 which joins connecting pipe 40 which extends to the lower section 50 of distillation apparatus 44. The valve 38 is movable between off and on positions and is constructed to permit water flow only in the direction 131.

The distillation apparatus 44 is supported on surface 12 by legs 46, or other known alternative supporting means, and includes a boiler 42 in upper section 48 and a condenser 52 which is positioned in both upper and lower sections. The boiler 42 utilizes an interior boiling chamber 54 with a narrowing neck 56 through which water flows upward as evaporation occurs within the boiler. While valve 38 is open, the water level 126 in the boiler will be the same as level 34 in container 22 so long as the pressure in container 22 and area 116 of the boiler is equal.

A connecting vent 47 has a trap 49 and extends from just above water level 34 of container 22 to just below water level 126 of boiler 42. The trap is normally filled with water to level 126, and this vent serves the two following purposes. When evaporation within the boiler 42 causes a vapor pressure increase in boiler space 116, the pressure increase causes the water level 126 to fall slightly to some lower level determined by the magnitude of the pressure increase. This falling water level would, in the absence of vent 47, result in degassed water being forced through pipe 40 and back into container 22. Instead, the slight pressure increase in space 116 forces a slight amount of water from boiler 42 into vent 47 and toward container 22 to substantially equalize the water levels in container 22 and boiler 42. The second purpose of vent 47 is to prevent water vapor within boiler 42 from flowing along the vent into degasification container 22 in the event of a significant fall in boiler water level below vent 47. The presence of the trap 49 blocks such vapor flow because the pressure differential between area 116 and chamber 24 is too small to displace the water in the trap.

A circular anti-spatter plate 51 is fixed to the outer periphery of the manifold 96 and intercepts any solid particles which might be ejected from the water 54 during virgorous boiling.

Positioned within the neck 56 is a heat transfer coil 58 which is connected through gas exhauast channel 60 and one-way, manually actuatable valve 62 to the top 23 of the degasification container. Accordingly, the gas exhaust channel 60 permits the gaseous content of the upper portion of the chamber 24 to be evacuated along the channel 60 and through heat transfer coil 58, the exhaust gas being pulled from coil 58 into channel 64 and gas outlet 70 by vacuum pump 66 which is connected to an electrical power source 69 and exhausts the air from chamber 24 to the atmosphere.

The vacuum pump 66 provides a means for establishing a partial vacuum in chamber 24 and when actuated to evacuate the chamber 24, the lowered atmospheric pressure within the chamber causes the dissolved gases within the impure water 26 to almost immediately leave the water. These gases bubble vigorously to the surface 34 and are then pumped from the chamber 24 through valve 62 and along the channel 60. When such dissolved gases come out of solution with the water 26, an internal heat transfer occurs in which the water 26 is significantly cooled and the removed gases absorb the heat lost from the water 26. Accordingly, by pumping these heated exhaust gases along the gas exhaust channel 60 and through the heat transfer coil 58, much of the heat carried by the exhaust gases will be transferred to water 68 entering boiler 42 and can be used to bring the temperature of the water 68 nearer its boiling point.

After such heat transfer occurs in coil 58, the cooled gases flow along channels 64, are pulled through the vacuum pump 66 and exhausted through gas outlet 70 to the atmosphere. Accordingly, the lines 60 and 64, coil 58, outlet 70, and the valve 62 collectively comprise a gas exhaust channel which extends from the top of the degasification container 24.

The cooled liquid in the degasification container 24 is subsequently delivered along pipes 36 and 40 to the condenser 50 where the cool water provides a means for condensing vapor generated in the boiler, as will be described further hereafter. As vapor condenses within condenser 52, heat is transferred from the vapor to water 68 surrounding the condenser 52, and this heat tends to warm the water 68. This warmed water will eventually move into the boiler 42, where it will be evaporated.

The distillation apparatus 44 includes a heating coil 72 positioned in the boiler 42, the heating coil 72 being connected through line 74 to receive the output from heat pump 76. The pump 76 compresses and heats a refrigerant-type gas such as freon which will be circulated through heating coil 72 to heat and evaporate the water 68 within boiler 42. The outlet line 78 from the coil 72 is connected through valve 80 to an expansion valve 82 so that pressurized refrigerant gas leaving the line 78 and expanding through valve 82 will serve as a coolant for cooling coil 84, which is positioned within the condenser. The outlet from the coil 84 is connected through line 86 to the inlet of the heat pump 76 for recycling of the refrigerant gas.

The line 89 is connected with a parallel line 88 which includes a valve 90 and a radiator 92 with electric ventilating fan 94. It has been found that it is sometimes desirable to cool the refrigerant which leaves the boiler 42 through line 78 before injecting it into the cooling coil 84. By closing valve 80 and diverting the refrigerant along parallel line 88 through air ventilated radiator 92, the excess heat in the gas can be removed so as to deliver the refrigerant gas to the cooling coil 84 at lower temperature. When the radiator 92 is unneeded, the valve 90 is closed and the valve 80 opened to resume normal flow between the coils 72 and 84.

While the embodiment 10 has been shown as utilizing a heat pump 76 to provide necessary heat for distillation, it should be understood that the line 74 may be coupled with other heat sources such as solar collectors, geothermal heat sources, and the like, and when such sources are available, the heat pump 76 will often be unneeded.

The condenser 52 of the distillation apparatus includes an intake manifold 96 positioned at the upper end of the apparatus 44 and being open ended, to receive water vapor evaporated from the surface 126 of the water 68. The condenser manifold 96 is connected through a condensing line 98 to condenser coil 100 which is immersed in cold incoming water within lower section 50. While the manifold 96, line 98 and coil 100 have been illustrated as having a specific configuration and number of coils, it should be understood that the structures are illustrative and that other condenser configurations and coil lengths may be substituted. The specific cross sectional area of the condenser passages within components 96, 98 and 100 may be made larger or smaller to accommodate varying volumes of condensate. The inside diameters of these components should be sized to permit continuous vapor flow therealong and to avoid complete closure or blockage of the components by condensed liquid. Such continuous flow is desirable so as to readily permit evacuation of the chamber 116 and the maintaining of a lowered pressure therein. The outlet of the coil 100 extends through condenser outlet pipe 102 through valve 104 to a pure water reservoir 106 which will be described further hereafter. Positioned below the condenser coil 100 at the bottom of the lower section 50 of the boiler is a sludge drain 108 with a manually actuatable valve 110 so that accumulated sludge in the lower section of the distillation apparatus may be periodically removed and the apparatus purged.

Figure 2:
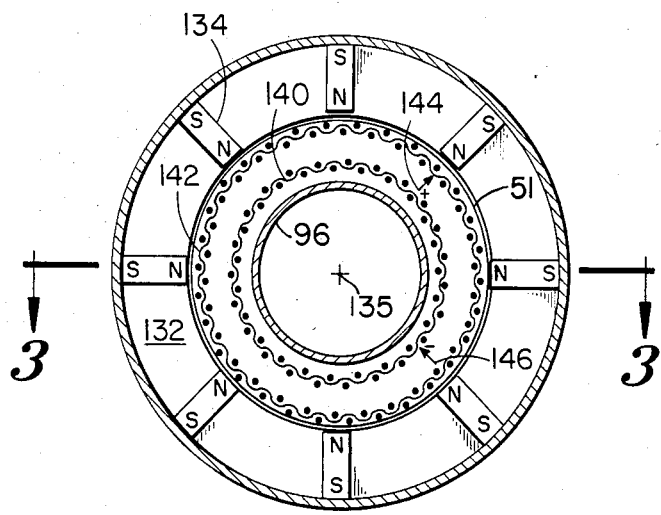
FIG. 2 is a cross sectional top elevation view of the ion removal device of FIG. 1 taken in the direction of cutting plane 2—2 of FIG. 1.
Figure 3:
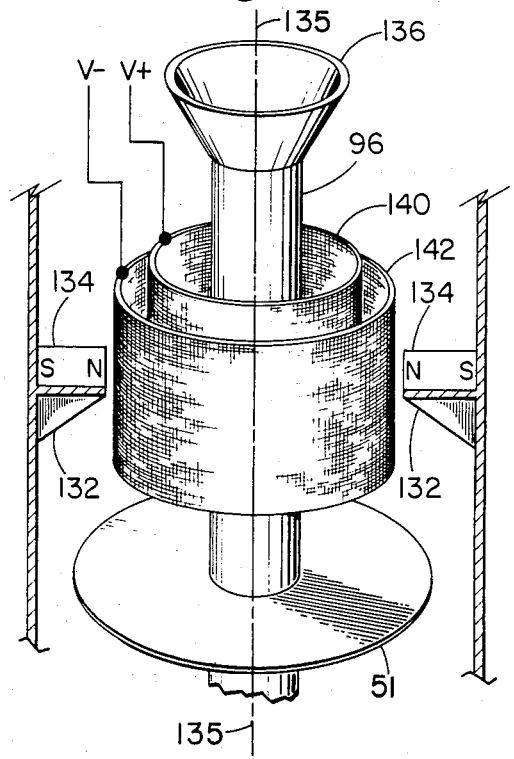
FIG. 3 is a side cross sectional view of the ion removal device of FIG. 2 taken in the direction of cutting plane 3—3 of FIG. 2.

Near the top of boiler 42, an annular shelf 132 extends inward to define a vapor passage along the axis 135 and to receive a plurality of permanent magnets 134 having a common pole, such as the shown north pole, facing the center axis 135 of the boiler. This ring of magnets, as best shown in FIG. 2, defines a means for producing a magnetic field with lines of force which extend parallel to the central axis 135 of the boiler. While the field has been shown as being established by permanent magnets, it should be understood that electromagnets may be substituted and are within the purview of the invention.

Adjacent the ring of magnets and along and coaxial with the central axis 135 are a concentric positive electrode or anode screen 140 and a negative electrode or cathode screen 142 charged with a positive voltage V+ and a negative voltage V−, respectively. These screens cooperate to define an electric field therebetween.

Some contaminated water sources commonly contain charged ions, some of which are not effectively removed by distillation. As these positive and negative ions move with the water vapor from the surface 126 toward the intake 136 of manifold 96, they pass through the described electric and magnetic fields. As best shown in FIG. 2, a positive ion 144, when it encounters these fields, will be accelerated by the fields in radial direction 144 toward cathode screen 142, where the charged screen 142 permanently collects and removes the positive ion. Correspondingly, a negative ion is urged by the magnetic and electric fields in radial direction 146 toward anode screen 140, where the positive charge of the screen permanently retains the negative ion. In this manner, the unwanted ion impurities are removed as they travel upward with water vapor toward the intake of manifold 96.

The use of the magnetic field serves a further function in that the field extends throughout much of the boiler and tends to heat dissolved metal molecules in the boiler by induction. When the apparatus 10 is in use, there are substantial quantities of metallic impurities which are in solution with the impure water and which during boiling circulate throughout the boiler. These impurities, in moving through the magnetic field, are heated by induction and transfer this heat to the surrounding water 68 and cooperate in heating the water to its boiling point.

The pure water reservoir 106 is a closed, sealed container and is connected through one-way valve 112 and pipe 114 to the exhaust gas channel 64 so that the vacuum pump 66 can simultaneously evacuate both the degasification container 24 and the pure water reservoir 106. It should be understood that as a result of the evacuation of air from within the reservoir 106, the top 116 of the boiling chamber 54 is also being evacuated with the gases and water vapor being pulled into the intake 136 by action of the vacuum pump 66. Consequently, water 68 at the top of the boiler is being subjected to a partial vacuum, causing the water 68 to boil at a lower temperature than the 212 degrees Fahrenheit boiling point associated with sea level pressure. With the reduced pressure in area 116, the water can be at a lower temperature and rapid boiling can still be produced. Typically, the shown apparatus will boil and efficiently evaporate water 68 with a water temperature of approximately fifty degrees Fahrenheit.

At the bottom of the pure water reservoir 106, an outlet 120 is connected through one-way valve 122 to a detachable water transport and storage container 124 which is maintained under partial vacuum condition. The container 124 may be any suitable sterile container capable of withstanding atmospheric pressure when internally evacuated but which is easily detached from an evacuated reservoir such as 106 without admitting unwanted outside air to the container 124. It will be understood that since degased, distilled water has been produced and is being stored in container 124, it is desirable to avoid the presence of any air within the container 124 so that the water does not again absorb atmospheric gases or contaminants.

While manually actuated valves 16, 38, 62, 80, 90 and 104 have been shown in the drawing for controlling fluid flow, it should be understood that some or all of these valves can be replaced by automatically controlled valves operable from a remote location by a control system and such an alternative is within the purview of the invention.

Although a specific structural configuration of boiler and condenser has been shown in FIG. 1, it should be understood that the invention can be practiced with many other types of boilers and condensers. For example, the distillation apparatus 44 may be arranged with the boiler positioned below the condenser and with the condenser utilizing cooling coils to which water is supplied from the drain 36 of container 22. All such variations are within the purview of the invention.

OPERATION OF THE FIRST EMBODIMENT

In operating the embodiment 10, an operator first closes valve 38, and opens valves 16 and 62 at the degasification container 22. As valve 16 is opened, contaminated water flows through pipe 14, valve 28 and spigot 30 into the degasification chamber 24 until the float 32 rises to predetermined maximum water level 34, at which point float valve 28 closes to prevent entry of further contaminated water.

The operator next energizes vacuum pump 66 from power source 69 to extract atmospheric gases from the degasification chamber 24 and from the pure water reservoir 106.

As the pressure within the degasification container 24 drops, the dissolved gases contained in the water 26 begin to bubble out of the water and to accumulate in the chamber 24 above water level 34. As the gases leave the water 26, they are pulled from the chamber 24 along vacuum lines 60, 64 and 70 which conduct the exhaust gases in direction 130 and through vacuum pump 66 to exhaust them to the atmosphere. The one-way valve 62 prevents any significant return of such gases to chamber 24.

As the dissolved gases within the water 26 bubble to the surface and come out of solution with the water, there is a heat transfer process by which heat contained in the water is transferred to the exhaust gases leaving the water. This transfer process results in the gases being significantly warmed as they leave solution while, simultaneously, the water 26 is cooled by virtue of heat being transferred to the departing gases. This heat transfer process is utilized to facilitate the goals of the present invention.

As will be described further hereafter, the warmed gases leaving chamber 24 are used to preheat the water 68 entering the boiler 42 so as to aid in evaporation of the water, while the cooled, degassed water 26 within the container 24 will be used as a cooling medium for the condenser 52 of the distillation apparatus 44.

In evacuating the interior of the degasification chamber, it has been found that a pressure level of approximately 0.1 to 1.0 p.s.i. satisfactorily removes substantially all of the dissolved gases within the fluid. It should be understood, however, that this pressure range may be changed somewhat depending upon the ambient temperature and pressure at which the apparatus 10 is operated and upon the initial temperature of the contaminated water.

As the chamber 24 is evacuated through open valve 62, the vacuum pump 66 simultaneously evacuates the pure water reservoir 106 through line 114. Because gases are drawn to reservoir 106 from the evaporation chamber 116 of the boiler, following a path through manifold inlet 96, coil 100 and line 102, the evaporation chamber 116 is simultaneously being evacuated. Accordingly, the air pressure within the chambers 116, 106 and their interconnecting lines is also reduced to a partial vacuum.

After the gases within the water 26 in degasification container 24 have bubbled up to the top of chamber 24, the operator closes valve 16 and opens valve 38 to drain the cooled degassed water 26 into line 40 and into the distillation apparatus 44. As the cooled degassed water 26 enters the lower section 50 of the condenser, the cooled water serves as a condensing means, as will be described hereafter. Depending upon the sizes of the degasification chamber 24 and the condenser 50, it may require the degasification of more than one volume of water in chamber 24 before sufficient water has been degassed to fill apparatus 44 to water level 126. In this description, it will be hereafter assumed that the apparatus 10 is filled to the levels 34 and 126 shown in FIG. 1 and is operating in a steady state condition.

It should be understood that each time the degasification container 24 is refilled through valves 16 and 28, and the water is degasified, warmed exhaust gases are removed through line 60, and gases pass through heat exchanger coil 58. Significant quantities of the heat contained in the exhaust gases are transferred through coil 58 to the degassed water 68 surrounding and in contact with the coil, thereby transferring warming the water 68 as it enters the boiler 42. Accordingly, as degassed water flows into lower section 50 along pipe 40 and rises upwardly past the coil 58, the water is warmed by the coils as it moves toward the boiler 42. Because the air pressure in 116 of the boiling chamber 54 is significantly lowered by action of pump 66, the boiling point of the water 68 is substantially lower than 212 degrees Fahrenheit. The boiling point of the water 68 can be reduced to temperatures well under 100 degrees Fahrenheit, thus reducing the amount of heat required to evaporate the water. The water 68 also receives additional heat due to heat generated by magnetic induction and transferred from the metallic impurities to the water 68 as described earlier.

To supply further heat for evaporation of the water 68, a heating coil 72 in the boiler 42 may be actuated by having compressed warm fluid flowing along line 74 in direction 129 from electrically energized heat pump 76. Fluid within heating coil 72 flows along pipe 78 to parallel branches 88 or 89. The branch 88 is connected through valve 90 with radiator 92 and the use of this branch will be explained hereafter. The branch 89 feeds the compressed fluid through valve 80 and to expansion valve 82. The outlet of the expansion valve connects to cooling coil 84, and as the compressed fluid expands through the valve 82, the coil 84 is cooled and functions to cool water in the lower section 50 which in turn helps the condenser 52 to condense water vapor moving within the condenser. The fluid then returns from coil 84 in direction 127 to line 86 which returns to the heat pump 76. Accordingly, the heat pump 76 provides heating to the boiler to evaporate the degassed water contained therein and cooling to the condenser.

As water boils in the upper section 48, the water vapor moves upwardly into area 116 and is pulled into the condenser manifold inlets 136 because of the action of vacuum pump 66. Such vapor moves downwardly through the condenser manifold 96 and pipe 98 to condensing coil 100. The pipe 98 and coil 100 are positioned at successively lower levels in the condenser, thereby contacting successively cooler layers of water. The water vapor condenses to a liquid within the coil 100 and flows downwardly through open valve 104 into pure water reservoir 106.

As the water level 126 falls due to evaporation of the water 68 in the boiler 42, the water level 34 in degasification container 22 also drops, causing valve 28 to open to admit additional contaminated water through spigot 30. This newly added water keeps the overall water level in containers 22 and 42 at levels 34 and 126, and the added water is degassed almost instantaneously after entering container 22 because of the near vacuum maintained above the water therein. The valve 38 is kept open when the apparatus 10 is operating in a steady state condition.

When the apparatus 10 is initially being started up, the valve 38 is closed while a first volume of water is retained for the short time needed to degass the water in container 22. The valve 38 is then opened to drain that volume of water to distillation apparatus 44. Additional volumes of water are degassed in container 22 with valve 38 closed during degassing and then opened for draining, until the boiler 42 is filled to level 126 with degassed water. When level 126 is reached, valve 38 may remain open thereafter during continued steady state operation.

Charged ions moving upward within magnetic field 138 are accelerated toward the anode or cathode screens 140 or 142, respectively, and retained by the screens to thus remove such ions as are traveling with the water vapor toward the inlet 136 of manifold 96.

As the pure water reservoir 106 fills, it can be periodically drained through line 120 and valve 122 into a removable, evacuated, sealable pure water container 124 suitable for storing or transport of the purified water. Container 124 is constructed so as to prevent the entry of any outside contamination into either the container 124 or the reservoir 106.

If additional cooling of condenser coil 84 is needed, an operator may close normally open valve 80 in the line 89 and open valve 90 to divert the refrigerant through parallel line 88 and radiator 92. The fan 94 may be actuated to further cool the fluid passing through the radiator 92 to thereby provide further cooling of the refrigerant before it reaches the expansion valve 82. Unless such additional cooling is needed, valve 90 is kept closed and valve 80 is open.

After lengthy operation, a sludge layer can accumulate at the bottom of the distillation apparatus 44, and such sludge should be removed through sludge drain 108 by opening normally closed drain valve 110.

Accordingly, to obtain steady production of purified water, the degasification apparatus 20 is kept filled by valve 28 and the gas exhaust removed through valve 62. As the water level 34 slowly drops as the liquid in the boiler evaporates, amounts of incoming water move through valve 28 and on entering the depressurized chamber 24 rapidly are degassed. The incoming water discharges near surface 34 so as to be more rapidly degassed and to avoid introduction of gases to the lower portion of the container 22 from which degassed water is regularly withdrawn to the boiler through valve 38. When the water is maintained at level 34 in degasification container 24 and at level 126 in boiler 42, the apparatus 10 produces a steady flow of purified water to container 106. It has been found that the device will produce water so pure as to have a conductivity of approximately 18 micromhos even when the incoming water is ordinary sea water having a conductivity on the order of 5000 micromhos. The water may be recycled through the apparatus 10 to obtain further purity.

SECOND EMBODIMENT

Figure 4:
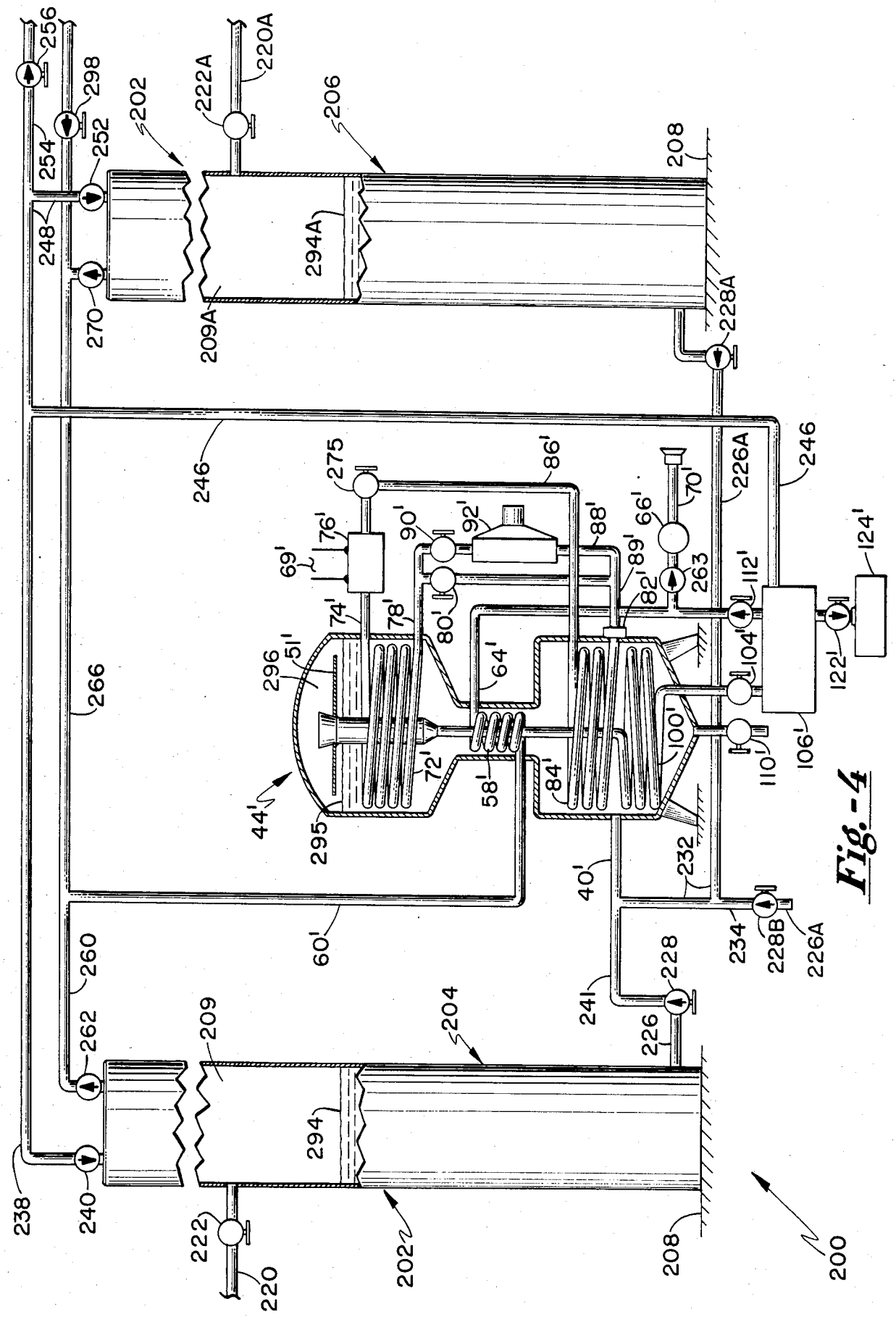
FIG. 4 is a schematic view of a second embodiment of a water purification device, taken partly in cross section and utilizing a plurality of degasification towers.

Referring next to FIG. 4, a second embodiment 200 of a water purification device embodying the invention utilizes a distillation apparatus 44' and a pure water reservoir 106' similar to that described in conjunction with the first embodiment 10 and combines it with a highly efficient degasification apparatus 202 which utilizes a plurality of towers to both degasify incoming contaminated water and also to provide the reduced pressure needed by the distillation apparatus 44' to boil water at a temperature well under 212 degrees Fahrenheit. The embodiment 44' differs from the embodiment 44 in that it has no ion removal apparatus. It should be understood, however, that such an ion removal device can be added to the embodiment 200 if desired. Because of the close correspondence between the apparatus 44 and the apparatus 44', the parts of the apparatus 44' which are identical to those of the apparatus 44 will be assigned the same reference numeral used on apparatus 44 and a prime will be added thereto.

The degasification apparatus 202 utilizes a plurality of substantially identical towers here shown as towers 204 and 206 with connections being shown for addition of a third tower. While only a pair of towers has been specifically shown, it should be understood that three or more towers may be used and are within the purview of the invention. Because the two towers are substantially identical, only the structure and operation of tower 204 will be explained in detail.

The tower 204 is similar to the degasification apparatus shown in U.S. Pat. No. 4,407,665 issued Oct. 4, 1983 to Henry C. Lasater and titled "Liquid Degasification Device". The tower 204 defines an upright selectably sealable degasification container which is preferably on the order of 33 to 60 or more feet in height and which is supported on a surface 208.

Preferably the degasification tower 202 is positioned with its upper end below the source of contaminated water. Ideally, the water source might be a waterfall or stream located at a higher elevation and from which the water may be delivered by gravity flow to contaminated water inlet 220 of the tower, completely filling the tower without the need for a pump. The inlet 220 is connected through a control valve 222 to the degasification chamber 209.

An outlet water line 226 is connected through one-way control valve 228 which allows water flow only from the container 202 toward the distillation apparatus 44'. The one-way valve 228 has its outlet connected to pipe line 40' which leads to distillation apparatus 44'.

A branch water line 232 extends from line 40 to a second one-way control valve 228A and second degasification tower 206. The one-way valve 228A allows water flow only from the tower 206 toward the distillation apparatus 44'. A line 234 extends from line 232, passing through one-way valve 228B and into line 226A, which would be connected to a third degasification tower, were it necessary to add a third tower to the disclosed system. In the absence of such a third tower, the valve 228B would be kept closed.

The tower 204 has a vacuum line 238 attached to its upper end through a one-way valve 240, the valve being arranged to permit flow of air and other gases from the line 238 into the tower 204 as will be described further hereafter. The vacuum line 238, along with vacuum line 246 and 248 with which it connects, collectively comprise a depressurization conduit which terminates at water reservoir 106'. The vacuum line 248 extends through one-way valve 252, ending at the top of degasification tower 206. The valve 252 is constructed to allow flow of air and other gases from the line 248 into the tower 206. A third vacuum line 254 extends through a manually controllable one-way valve 256 for connection to a third tower, if such tower is needed, and would also be part of the depressurization conduit when a third tower is used. The vacuum line connections just described, namely lines 238, 248 and 246, along with valves 222, 222A, 240, 252, 228, and 228A, collectively comprise a means for selectively establishing a partial vacuum in the degasification towers 204 and 206 and in the distillation apparatus 44', as will be described further hereafter. At times, the vacuum pump 66' and valve 263 also function as a portion of the means to establish the partial vacuum, particularly during priming of the apparatus 200.

A gas exhaust line 260 is connected to the top of tower 204 through a one-way valve 262 positioned to allow gas flow from the tower 204 to and along the line 260. The exhaust line 260 is connected to gas exhaust line 60 which connects with heat exchange coil 58' of the degasification apparatus 44'. Gases leaving the coil 58' flow through line 64', one-way valve 263, and vacuum pump 66' and leave outlet 70'. Also connected to gas exhaust line 60' is a second exhaust line 226 which extends through one-way valve 270 to the top of degasification tower 206. The valve 270 is connected so that air and other gases can leave the tower 206 and move toward the valve 270. The gas exhaust line also extends to a third one-way valve 298 which would join the top of a third tower if such third tower were utilized. In the absence of a third tower, the valve 298 is kept closed. Accordingly, the lines 260, 60', 58', 64' and 266, along with the valves 262, 263, 298 and 270, collectively constitute a gas exhaust channel to convey exhaust gases from the towers 204 and 206. A vacuum pump 66' is connected between valve 263 and outlet 70' and is used for priming the system as will be described hereinafter.

While valves 222, 222A, 228, 228A, and 228B have been illustrated and described as being manually actuatable, it should be understood that these valves may, if desired, be provided with suitable transducers to make them remotely controlled and may also be coupled with a control system adapted to perform the filling and draining steps described herein. Such an alternative is within the purview of the invention.

OPERATION OF THE SECOND EMBODIMENT

In operation, the embodiment 200 is preferably constructed and located at a site where the contaminated water supply is at a level higher than that at which the embodiment 200 will be constructed. It is desirable to have the water source at a higher level so that the source will flow downward by gravity flow into the purification device 200 rather than requiring pumping to the top of the towers 204 and 206. Where the water source's level is lower than the height of the towers, a pump may be used to raise the water to the top of the towers, and such alternative is within the purview of the invention.

Before continuous steady state operation is begun, the operator primes the embodiment 200 by first opening inlet valves 222 and 222A and closing valves 228 and 228A to permit contaminated water to enter degasification towers 204 and 206 along inlets 220 and 220A, respectively. Water in each of the towers is allowed to rise to the top of the tower, and the air initially within the towers is forced upwardly and through valves 262 and 270 of towers 204 and 206, respectively. When the towers are substantially filled with contaminated water, incoming flow is stopped by closing valves 222 and 222A.

The operator next actuates vacuuum pump 66' to continue the priming operation and opens valves 112', 104' and 122' so as to begin evacuating the air from the pipes and reservoirs upstream of the pump 66'. With these valves open, the air within gas exhaust lines 64', 58', 60', 260 and 266 is substantially removed. Simultaneously, the air within pure water reservoirs 106' ad 124', coil 100', manifold 96' and the unfilled interior of distillation apparatus 44' is also removed and a near vacuum achieved therein. The gases which were formerly within towers 204 and 206 and which have been urged upwardly into gas exhaust channels 260 and 266 by the rising water level, are removed by action of the vacuum pump 66'.

Valves 228 and 228A in the outlet water lines for the towers 204 and 206, respectively, have up to now been closed during filling of the towers. These valves will now be opened and the vacuum pump 66' turned off. After pump 66' is deactivated, the one-way valve 263 prevents air entering the system through the pump 66'. Opening of valve 228 permits the water within tower 204 to flow out through valve 228 and into distillation apparatus 44'. Simultaneously, opening valve 228A allows contaminated water to flow out of tower 206 through valve 228A into apparatus 44'.

As the water drains from the towers 204 and 206, the resulting water levels in the towers drop to an equilibrium level which will typically be 30 to 60 feet below the top of the towers, thereby creating a near vacuum condition above the water level 294 in the tower 204 and the water level 294A in tower 206. As this near vacuum forms, the dissolved gases present initially in the contaminated water come out of solution and substantially immediately bubble to the surface of the water within the towers. As the gases leave solution, they absorb heat from the water and are thus at a higher temperature than the water. Having lost heat to the gases, the water in the towers becomes notably colder. The gas removal process is virtually instantaneous with the creation of the vacuum, and accordingly these dissolved gases, which can include oxygen, nitrogen, carbon dioxide, hydrogen sulfide, sulphur dioxide and the like move to the evacuated chambers 209 and 209A above the water level 294 and 294A in each of the towers. As the water levels in the towers fall to levels 294 and 294A, the draining water flows upwardly in apparatus 44', reaching an equilibrium level 295 which is substantially equal to the levels 294 and 294A.

The valves 228 and 228A are next closed again, and the valves 222 and 222A are then opened. This permits additional contaminated water to flow from the contaminated water source to the towers 204 and 206, again raising the water levels to the tops of the towers. The rising water levels force the heated gases which were initially in the water and which have just been removed from solution to move upwardly and out of the towers through one-way valves 262 and 270, moving these exhaust gases along the exhaust gas channels toward heat exchanger coil 58'. Use of the one-way valves prevents the return to these exhaust gases to the towers, and the priming step is now complete. The steady state operation of the embodiment 200 will next be discussed.

During steady state operation, both towers 204 and 206 will be refilled with water to their tops and will be alternately drained to maintain the near vacuum conditions needed for degasification and efficient distillation. In describing the steady state continuous operation, it will be presumed that the two towers are fully primed and filled with water, that all water lines are filled with water, and that the vacuum lines 260 and 266 which leave the top of the towers and extend to the pure water reservoir 106' are substantially evacuated. It will further be presumed that valves associated with an optional third tower, namely valves 256, 298, and 228B are closed. Valves 228 and 228A will alternate between open and closed positions as the purification apparatus is used.

Referring next to the operation of the distillation unit 44', it should be understood that this unit operates substantially as was described with the first embodiment 44. Cooled degassed water entering the lower portion of the boiler through line 40' is first utilized to cool condensing coil 100' and then moves upwardly past coil 58' as additional degassed water enters the lower portion of the boiler through inlet 40'. The water moving upward past coil 58' absorbs the heat of the hot exhaust gases within coil 58' and subsequently such water moves upwardly to the boiler where heating coil 72' adds whatever additional heat from heat pump 76' as may be needed to achieve the desired boiling rate. Heat generated by heat pump 76', which is energized from electrical power source 69', is delivered to heating coil 72' through pipe 74'. Refrigerant gas leaves coil 72' and flows along line 78' passing through valve 80' and line 89' on its way to expansion valve 82' and cooling coil 84'. Refrigerant returns to the heat pump along line 86' and through shut-off valve 275. When it is desired to cool the refrigerant further before routing it to expansion valve 82', valve 80' is closed, valve 90' is opened and refrigerant flows through radiator 92' before entering expansion valve 82'. Any sludge accumulation in apparatus 44' is drained through valve 110'. Boiling of the water is further promoted by maintaining a partial vacuum in the space 296 so that the water will boil at a significantly lowered boiling point. Boiling is readily achieved with the apparatus 44' at temperatures between 50 and 100 degrees Fahrenheit. As the water level 295 drops in the apparatus 44' in response to the rapid evaporation, additional water will be added alternately from towers 204 and 206 as described hereafter.

When the water level has dropped below level 295 in the boiling chamber, the operator opens outlet valve 228 to permit outward flow of the degassed water at the bottom of tower 204 along line 226 and into condenser of apparatus 44'.

As the valve 228 is opened, the water level in the tower 204 drops downwardly to a level 294 which may be 30–60 feet below the top of the tower 204. The water formerly in the lower portion of tower 204 drains downwardly and flows into the distillation apparatus 44' until the water level 295 in the apparatus 44 is substantially the same as level 294. As the water level drops within tower 204, a partial vacuum forms above the water level 294 in the tower, and virtually simultaneously with the dropping of the water level and creation of this partial vacuum, dissolved gases from within the water in tower 204 come out of solution and virtually immediately bubble to the surface 294 and enter the space above the level 294. Within a short period of time, on the order of from ten to thirty seconds, the newly added contaminated water within the tower 204 has been substantially degassed.

As the water level 294 drops during the draining of the water from the tower 204, any air or gas within vacuum line 238 is drained into the evacuated space at the top of the tower 204 through one-way valve 240 to thus effectively evacuate air and other gases from lines 238, 248 and 246. This results in the pure water reservoir 106' being evacuated and steam and water vapor in the space 296 of the boiler being pulled into the manifold 96'. Accordingly, as the water drops in tower 204, the dropping level and the near vacuum created by the falling water tends to evacuate the gases from the pure water reservoir 106' to assure that no gases are present in the reservoir to redissolve into the purified water eventually to be stored in the reservoir. In addition, the falling water level in tower 204 maintains the partial vacuum over the degassed water in tower 204 so that any remaining dissolved gases which have not yet left solution will do so.

As the dissolved gases come out of solution with the water within the tower 204, there is a heat exchange process by which the gases are substantially warmed and the remaining degassed water, which has given up its heat to the gases, drops significantly in temperature. This water, whose temperature is substantially lowered, will flow to the apparatus 44' when valve 228 is opened and will be applied to the condensing coil 100'.

At this time, valve 228 will be closed by the operator and tower inlet valve 222 opened to admit additional contaminated water to the tower 204. As the water level in the tower 204 rises, the removed and warmed exhaust gases above water level 294 are pushed upwardly and out of the tower through one-way valve 262, along pipe 60' and through the heat transfer coil 58', where the heat carried by the gases is transferred to the water within the boiler to prewarm the water prior to its evaporation. The now cooled exhaust gases move along pipe 64' and are exhausted to the atmosphere through outlet 70'. The vacuum pump 66' may be used intermittently, if desired, to further increase the rate at which the exhaust gases leave the system.

When evaporation within apparatus 44' has depleted the water therein sufficiently, the second tower 206 will be drained through valve 228A from its previously full condition to degasifiy the water in tower 206. With inlet valve 222 closed, the operator opens drain valve 228A and the water level within tower 206 drops downwardly to level 294A with water leaving the tower through pipe 226A and flowing into the apparatus 44'. As the water level drops to level 294A, substantially all of the dissolved gases contained within the water leave solution and bubble immediately to the surface 294A. A heat transfer occurs during degasification in tower 206 by which the gases carry a significant amount of heat from the water and the water is proportionately cooled.

The tower 206 is now ready for refilling, and the operator will open valve 222A and close valve 228A to permit the water level to rise from level 294A to the top of the tower. As the water level rises, the warmed exhaust gases in the tower above level 294A are pushed upwardly and out of one-way valve 270 to move along exhaust gas lines 266 and 60'. These warm gases then flow through heat exchange coil 58' to transfer the heat to water within the apparatus 44' and are then exhausted to the atmosphere through line 64' and outlet 70'.

With the dropping of the water level within tower 206, and the forming of a vacuum above the water level 294A, the vacuum tends to pull any air or gas through one-way valve 252, thereby aiding in evacuating lines 248, 246 and 238. By evacuating these lines, the vacuum in pure water reservoir 106' is also maintained. In addition, since line 246 passes through pure water reservoir 106' to communicate with condenser coil 100' and manifold 96', the vacuum established by the tower 206 also pulls the vapor at the top 296 of the boiler into the condenser manifold 96'. By utilizing two or more towers to maintain the vacuum, as just described, it is possible to substantially reduce the need for operating vacuum pump 66' during steady state operation of the embodiment 200.

Accordingly, the towers 204 and 206 are used alternately and repeatedly to degasify the water entering the towers to thereby establish a partial vacuum in the described portions of the structure. The near vacuum established by the tower also moves the warmed, removed gases to coil 58' to heat water around the coil. The cooled water remaining after the degasification step is used for condensing the steam and vapor within the apparatus 44'.

The pressure over the water in the boiler in area 296 is continually kept at low levels by the falling water levels in towers 204 and 206 which, as the water falls in either tower, tends to pull the vapor from space 296 into the top of manifold 96'. If additional pressure reduction is needed, the vacuum pump 66' can be activated intermittently. As the water is evaporated from the water in the boiler, the water vapor and steam moves into the manifold 96' and downwardly through the condenser coil 100' which is in continuous contact with cold incoming degassed water. The steam and water vapor within the coil 100' and manifold 96' condense to water droplets and the droplets drain downwardly into pure water reservoir 106'. As the reservoir fills to capacity, discharge valve 122' is opened and the water drains downwardly into removable, evacuated, sealed container 124' which is periodically removed and replaced.

As will be better appreciated after reading of the foregoing description, it is desirable to arrange the volume of the towers 204 and 206 to be less than the volume of the distillation apparatus 44' so that the apparatus 44' can evaporate its water at a rate compatible with the volumes of water drained into the apparatus 44' each time a tower is drained and compatible with the frequency rate of such draining. Naturally, the volume and configuration apparatus 44' should be such as will assure that the inlet to manifold 96' is always above the water level within the apparatus 44'.

While only two towers have been shown and explained in detail with the embodiment 200, it should be understood that three or more towers can be utilized, with each tower being used successively to degasify the water therein and aid in the creation of a partial vacuum in the apparatus 44', pure water reservoir 106' and in manifold 96'.

The invention provides an apparatus by which a wide variety of water contamination problems may be solved and most forms of contamination, whether gaseous, solid or ion, removed. The device is efficient and particularly adaptable to typography situations where contaminated water is at a level higher than that associated with the purification apparatus to thereby permit filling of the apparatus by gravity flow. When the invention is practiced with the disclosed degasification towers, an effective vacuum level can be maintained throughout the purification device while utilizing only the towers to maintain the vacuum. Accordingly, the amount of energy required to move the water through the apparatus and to maintain the vacuum is significantly reduced, and low cost water purification made practical for many areas where contamination problems exist.

While the preferred embodiments of the present invention have been described, it should be understood that various changes, adaptions and modifications may be made therein without departing from the spirit of the invention and the scope of the appended claims.

What is claimed is:

1. An energy conserving water purification device comprising: means enabling support on a surface for degassing and distilling impure water containing dissolved gases and other solid impurities and for connecting to a power source and for accomplishing degassification by applying a partial vacuum to the water, such partial vacuum producing a thermal side effect sufficient that the removed gases are warmed and the degassed water cooled during degassification, including,
    a degassification apparatus for extracting the dissolved gases from the impure water and including a degassification container for receiving the impure water and having a top, a bottom and a water inlet and outlet, said container constructed and arranged to be selectively sealable so as to maintain at least a partial vacuum therein;
    a distillation apparatus for removing the solid impurities from the impure water and connected in fluid flow relationship with said outlet of said degassification container to receive degassed water therefrom, said distillation apparatus including a boiler, a condenser and a purified water reservoir;
    means for selectively establishing a partial vacuum in said degassification container and in said distillation apparatus for causing to be produced cooled, degassed water and warmed removed gases above said cooled degassed water in said container and to produce a lowered boiling point for water in said distillation apparatus; and
    a gas exhaust channel extending from said top of said degassification container and including a gas outlet, said exhaust channel positioned to receive the warmed gases removed from the water in said degassification container and positioned in heat transfer relationship with at least one of said apparatuses to transfer heat from the warmed gases received within said exhaust channel to the cooled, degassed water so as to warm the degassed water.

2. The water purification device of claim 1 wherein said gas exhaust channel extends within said distillation apparatus to transfer heat to the degassed water within said distillation apparatus.

3. The water purification device of claim 2 wherein said gas exhaust channel passes through said boiler and includes a coil to transfer heat by conduction to the water in said boiler.

4. The water purification device of claim 1 wherein said means for establishing a partial vacuum includes a vacuum pump connectable to the power source and connected to said gas outlet of said gas exhaust channel.

5. The water purification device of claim 1 wherein said gas exhaust channel includes a one-way valve positioned to permit gases which have been removed from the impure water to flow out of said degasification container.

6. The water purification device of claim 1 wherein said purified water reservoir is connected in fluid flow relationship to said condenser of said distillation apparatus to receive distilled water, said means for establishing a partial vacuum being connected with said purified water reservoir to maintain a partial vacuum in said reservoir.

7. The water purification device of claim 1 wherein said degasification container has a height of at least thirty-three feet, and said means to establish a partial vacuum incudes valve means connected with said degasification container to permit selective filling of said container with impure water, sealing of said top of said container, and selective draining of water from said bottom of said container to thereby create a partial vacuum at the top of said container.

8. The water purification device of claim 7 and further including a depressurization conduit communicating with said top of said degasification container, said purified water reservoir connected with said condenser to receive water from said condenser and connected to said depressurization conduit so as to use the partial vacuum in said container to maintain a partial vacuum in said purified water reservoir.

9. The water purification device of claim 7 wherein said degasification apparatus further includes a second degasification container having a height of at least thirty-three feet and connected in fluid flow relationship to said distillation apparatus.

10. The water purification device of claim 1 wherein said distillation apparatus includes a vapor passage in said boiler and further includes means for establishing an electric field along said vapor pasage, said electric field means including a positive electrode and a negative electrode energized by the power source to attract and capture negative and positive ions, respectively, moving along said passage.

11. The water purification device of claim 10 wherein said passage has a regular geometrical cross section and said electric field means has one of said electrodes substantially centered on said cross section and the other of said electrodes positioned adjacent the circumference of said cross section.

12. The water purification device of claim 11 wherein said electrode centered on said cross section is said positive electrode and said electrode on said circumference is said negative electrode.

13. The water purification device of claim 11 wherein said electrode on said circumference is cylindrical in configuration and extends about the circumference of said passage.

14. The water purification device of claim 10 wherein said magnetic field means includes a plurality of magnets positioned around the circumference of said vapor passage and having like poles confronting said passage.

15. The water purification device of claim 10 wherein said distillation apparatus further includes means for producing a magnetic field, said magnetic field means positioned along said vapor passage with said magnetic field having lines of force extending along said passage so as to cause ions moving along said passage to be forced toward one of said electrodes so as to remove the ions from the vapor.

16. The water purification device of claim 15 wherein said magnetic field producing means are positioned adjacent said boiler so said magnetic field passes through water in said boiler to thereby heat the other impurities in the water by magnetic induction when boiling of the water causes movement of the impurities across the magnetic field.

17. A water purification device comprising: means for degassing and distilling impure water containing dissolved gases and other impurities and for connecting to a power source and for accomplishing degassification by applying a partial vacuum to the water, such partial vacuum producing a thermal side effect sufficient that the removed gases are warmed and the degassed water cooled during degassification, including, a degassification apparatus for extracting the dissolved gases from the impure water and including a plurality of degassification containers for receiving the impure water, each said container having a water inlet to receive the impure water and having a top, a bottom and a water outlet, each said container constructed and arranged to be selectively sealable so as to maintain a partial vacuum therein and each said water outlet including a one-way valve to allow degassed water to flow from each container, said outlets being connected in parallel with one another downstream of said one-way valve;

a distillation apparatus for removing the other impurities from the impure water and connected in series in fluid flow relationship with said parallel connected water outlets of said degassification containers to receive the degassed water therefrom, said distillation apparatus including a boiler and a condenser connected in fluid flow relationship with said parallel connected outlets; and means for selectively establishing a partial vacuum in each said degassification container and in said boiler so as to produce cooled, degassed water and warmed gases above the degassed water in said containers and to cause a lowered boiling point for water in said boiler.

18. The water purification device of claim 17 and further including a gas exhaust channel extending from said top of each said degasification container and including a gas outlet, said exhaust channel receiving the gases removed from water in each of said degasification containers and positioned in heat transfer relationship with at least one of said apparatuses to transfer heat from the warmed gases within said channel to the cooled, degassed water so as to warm the degassed water.

19. The water purification device of claim 18 wherein said gas exhaust channel extends within said distillation apparatus to transfer heat to the degassed water within said distillation apparatus.

20. The water purification device of claim 19 wherein said gas exhaust channel passes through said boiler and includes a coil to transfer heat to the water in said boiler by conduction.

* * * * *